United States Patent [19]

Balfanz

[11] Patent Number: 4,466,069
[45] Date of Patent: Aug. 14, 1984

[54] FLAME CUTTING MACHINE WITH LOST CUT RE-ESTABLISHMENT

[75] Inventor: Fredrick J. Balfanz, Waukesha, Wis.

[73] Assignee: C-R-O, Inc., Menomonee Falls, Wis.

[21] Appl. No.: 286,556

[22] Filed: Jul. 24, 1981

[51] Int. Cl.³ .............................................. B23K 7/10
[52] U.S. Cl. .................................. 364/475; 364/171; 266/58; 266/69
[58] Field of Search ....................... 364/474, 475, 171; 266/48, 58, 59, 69; 83/71

[56] References Cited

U.S. PATENT DOCUMENTS

| | | | |
|---|---|---|---|
| 3,123,657 | 3/1964 | Clark, Jr. et al. | 266/58 |
| 3,591,157 | 7/1971 | Culp, Jr. et al. | 266/59 |
| 3,911,346 | 10/1975 | Schneekloth | 266/58 |
| 4,328,050 | 5/1982 | Ashizawa et al. | 266/58 |
| 4,349,182 | 9/1982 | Blackburn | 266/59 |
| 4,363,468 | 12/1982 | Noe | 364/475 |
| 4,372,538 | 2/1983 | Balfanz | 266/69 |

*Primary Examiner*—Gary Chin
*Attorney, Agent, or Firm*—Andrus, Sceales, Starke & Sawall

[57] ABSTRACT

A flame cutting machine is provided having a CNC control with a programmable memory wherein the memory is programmed to cause automatic cutting of rows of pieces continuously in succession, and wherein the memory also includes selectively actuatable instructions to prevent the torches disposed at a termination point from automatically proceeding to the next row, but instead to cause the torches to automatically proceed directly to the start-pierce point of the row just completed. The torch or torches which have properly cut a complete piece are turned off, while the remaining torch or torches which have involved a lost cut are re-activated at the start-pierce point so, as the row cutting cycle is repeated, the previously lost portions will now be cut. The memory is also programmed to selectively instruct the machine to reverse from the cut termination point if desired.

4 Claims, 3 Drawing Figures

U.S. Patent  Aug. 14, 1984  4,466,069
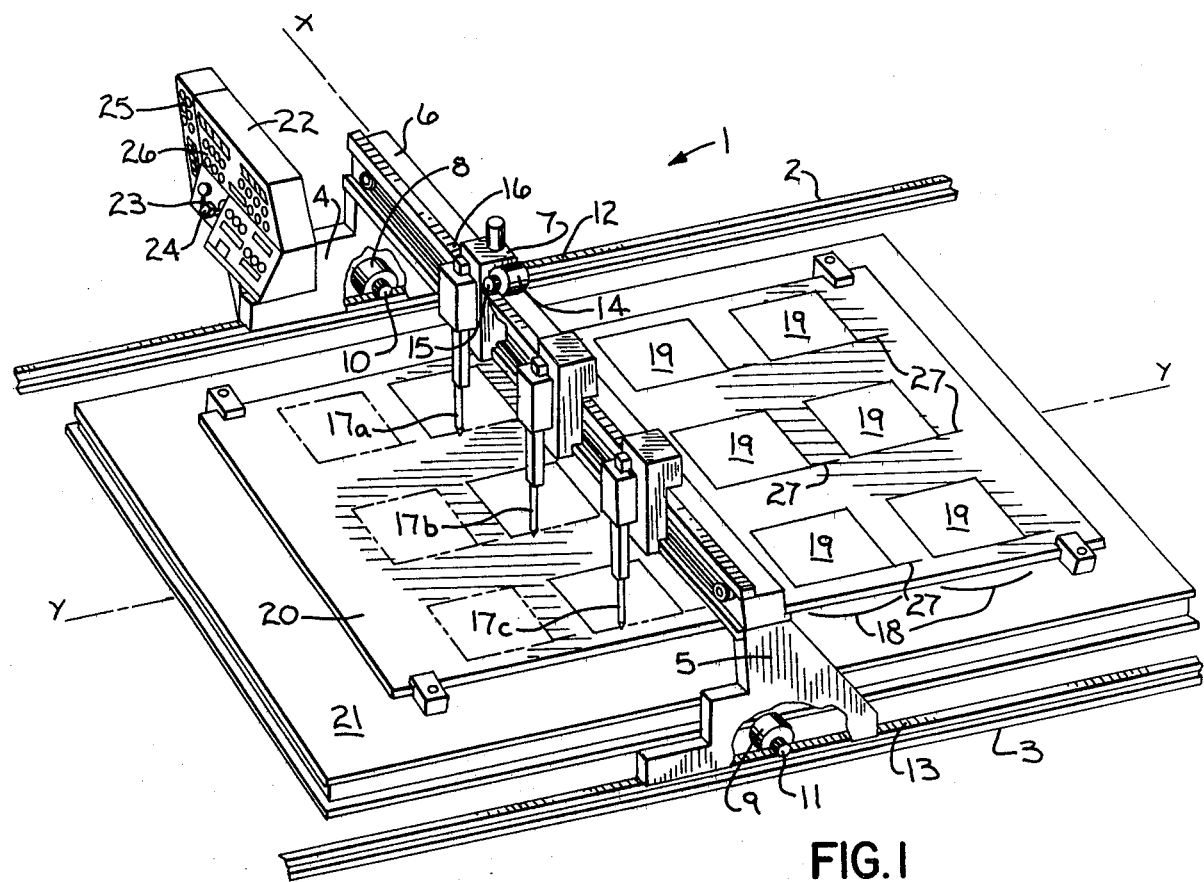
FIG.1
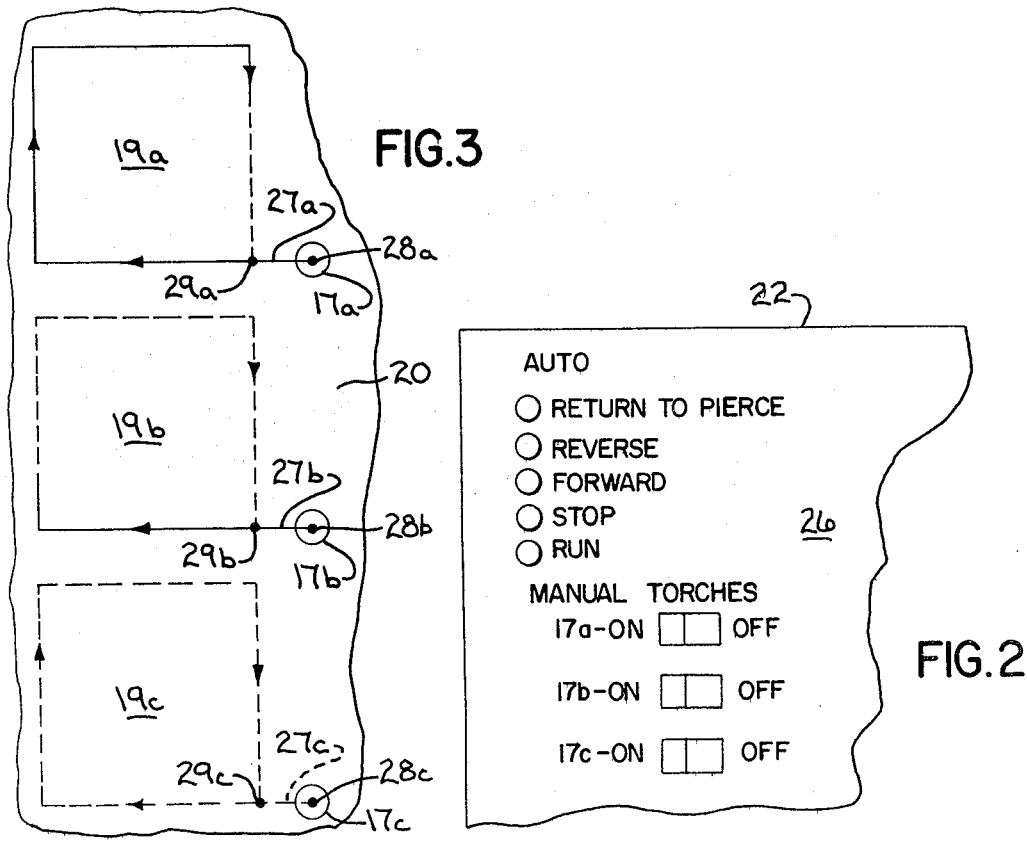
FIG.3
FIG.2

FLAME CUTTING MACHINE WITH LOST CUT RE-ESTABLISHMENT

BACKGROUND AND SUMMARY OF THE INVENTION

This invention relates to a flame cutting machine with lost cut re-establishment.

Flame cutting machines having a plurality of torches for cutting a plurality of rows of pieces in succession from a flat metal plate-like workpiece have long been known. It has also been known for some time to utilize a Computerized Numerical Control (CNC) having a programmable memory for automatically operating such machines.

Problems occasionally arise during flame cutting of a row of pieces in that one or more of the cutting flames may stop cutting at some point along the path of travel of one or more of the torches. If the cycle is completed for that row, the pieces adjacent flames which did not stop cutting will be properly cut, while the cut of pieces where the flame stopped cutting will be lost so that they are not completed. A defective row is thus created.

It has previously been known to reverse the row cutting cycle to place the torches at the point of beginning of the lost cut, re-adjust the adjacent torches and then re-run the remainder of the cycle so as to pick-up the lost cut on any affected piece.

There are numerous reasons for losing a cut. One of the primary reasons is that, at some point the workpiece becomes insulated from the heat of the flame and flowing oxygen. This may be due to surface conditions of the metal which may have rust or mill-scale thereon at scattered locations. Another reason is the occasional improper setting of the torch height or heat output, either by the operator or by the CNC itself.

It has been observed that a high percentage of lost cuts commence at or closely adjacent the start-pierce point for cutting, which is positioned on a lead-in line for the piece to be cut. This is usually due to the above-mentioned improper setting so that the flame does not provide the initial pierce of the workpiece at the start-pierce point.

In the type of flame cutting operation under consideration here, the row cutting cycle usually terminates a short distance, for example ⅛", from the start-pierce point on the lead-in line. To reverse the cutting cycle so that all the torches traverse their complete cutting paths from the cut termination point back to at or adjacent the start-pierce point in order to pick up a lost cut is undesirable, especially from the standpoint of time used.

It is a task of the present invention to provide a flame cutting machine of the type described above which gives the operator the capability of doing more than reversing the row cutting cycle for lost cut reestablishment.

It is a further task of the invention to give the operator the option of moving the torches directly from the cut termination point to the nearby start-pierce point, which is apt to be adjacent the lost cut, for repeating at least a part of the previous cutting cycle in the same row.

In accordance with various aspects of the invention, a flame cutting machine is provided having a CNC control with a programmable memory wherein the memory is programmed to cause automatic cutting of rows of pieces continuously in succession, and wherein the memory also includes selectively actuatable instructions to prevent the torches disposed at a termination point from automatically proceeding to the next row, but instead to cause the torches to automatically proceed directly to the start-pierce point of the row just completed. The torch or torches which have properly cut a complete piece are turned off, while the remaining torch or torches which have involved a lost cut are re-activated at the start-pierce point so, as the row cutting cycle is repeated, the previously lost portions will now be cut. The memory is also programmed to selectively instruct the machine to reverse from the cut-termination point, if desired.

BRIEF DESCRIPTION OF THE DRAWINGS

The accompanying drawings illustrate the best mode presently contemplated by the inventor for carrying out the invention.

In the drawings:

FIG. 1 is a generally schematic perspective view of a flame cutting machine incorporating the concepts of the invention;

FIG. 2 is a fragmentary view of a portion of the control panel for the CNC; and

FIG. 3 is a diagrammatic view of a row of three pieces to be cut from a workpiece.

DESCRIPTION OF THE PREFERRED EMBODIMENT

As shown in FIG. 1, the concepts of the invention are adapted for use with a flame cutting machine 1 which is mounted on a pair of parallel rails 2 and 3 which are secured to the floor. Support gantries 4 and 5 are mounted for movement along the respective rails, with the gantries supporting the ends of a transverse support or bridge 6 which extends over the cutting area. A plurality of carriages 7 are suitably mounted for simultaneous movement along bridge 6 and may be adjustably ganged together in any suitable well-known manner.

Bridge 6 defines a main X axis, while rails 2 and 3 are parallel to a main Y axis, for purposes of reference.

Bridge 6 is adapted to be driven in the Y axis direction by any suitable motive means, such as motors 8 and 9 which are mounted in gantries 4 and 5 and which have respective pinions 10 and 11 which mesh with respective racks 12 and 13 disposed along rails 2 and 3. Similarly, the ganged carriages 7 are adapted to be driven along bridge 6 in the X axis direction by any suitable motive means such as a motor 14 on one of the carriages and which has a pinion 15 which meshes with a rack 16 disposed on the bridge.

Carriages 7 mount flame cutting torches 17a, 17b and 17c which are supplied with the necessary power and fuel, including oxygen from any suitable conventional source, not shown.

Machine 1 is adapted to cut a plurality of rows 18 of a plurality of pieces 19 from a flat plate-like metal workpiece 20 which may be rigidly mounted on a fixed support 21. The configuration of pieces 19 may be of any suitable contour, those shown being rectangular.

It is desired that each row 18 of pieces 19 be cut individually and that the machine then move on to the next row for simultaneous cutting of the pieces therein. It is contemplated that this operation be automatically accomplished via a Computerized Numerical Control (CNC) 22 shown as mounted on gantry 4. CNC 22 is intended to drive bridge 6 and carriages 7 through their respective motive means along a desired path relative to the X and Y axes to form the ultimate cutting path for pieces 19.

CNC 22 is of any well-known type which is conventional in the metal cutting field and includes, among other things, a programming device which in this instance includes paper or magnetic tape 23 which passes over the usual pickup head section 24 which in turn inputs to the memory unit 25 of the CNC. See U.S. Pat. Nos. 4,014,495 and 4,121,808 for further details relative to the programmable numerical control devices.

In this particular instance, the program and thus memory 25 will include the X and Y coordinates of the start-pierce point of a given row, starting the torches, the contour of the cut itself, the cut-termination point, the automatic cutting movement, as well as the subsequent automatic movement of the torches 17a–17c to the start-pierce point of the next row. The programmable control also provides for manual selectively actuatable control of the automatic mode for reverse, forward, stop and run commands. The torch functions may also be operated manually. See the front panel 26 of CNC 22 (FIG. 2). All of this is conventional to those skilled in the art.

As previously explained, the program includes instructions in the automatic mode so that if the command button entitled "return to pierce" on panel 26 is pushed, the torches will not automatically continue on to the next row of pieces 19, but will instead automatically move directly from the termination point to the start-pierce point of the same row.

FIG. 3 is a representation of a single row of pieces 19a, 19b, 19c for cutting. The lines represent the desired contours of the pieces, the full lines representing portions actually cut by respective torches 17a, 17b and 17c, and the dash lines representing portions traversed by the respective torch but uncut due to loss of sufficient oxidation and cutting heat. FIG. 3 also shows the usual lead-in lines 27a, 27b, 27c, which have the start-pierce points 28a, 28b, 28c on their outer ends and the cut termination points 29a, 29b, 29c at the juncture between the lead-in lines and the cut pieces themselves.

Any single row of pieces being cut would not necessarily have lost-cut problems in all of the pieces, as appears in FIG. 3, the showing being for illustrative purposes only.

As machine 1 progresses automatically through a cutting cycle under the control of the CNC, the cut is lost for piece 19a just slightly before termination point 29a is reached; the cut is lost for piece 19b about ⅓ of the way around the contour from start-pierce point 28b; and the cut is lost for piece 19c right at the start-pierce point 28c on lead-in line 27c. The program will nevertheless cause all three torches to traverse the entire row until they all reach their respective termination points 29a–29c. If no further action is taken by the operator, the machine will move on to the start-pierce points on the lead-in lines of the next row. The operator, of course, has this option. However, it is more likely that the operator will want to save one or more of the defectively cut pieces. He therefore can push the "stop" button on panel 26 to stop continuance of the normal program.

During re-establishment of a lost cut, the CNC remains in the automatic mode but the operator pushes certain buttons on panel 26 to interrupt the automatic sequencing.

As to piece 19a, and because the cut was lost near termination point 29a, the operator can push the "reverse" button, causing all torches to move back to the point where the cut was lost on piece 19a, and then again push the "stop" button. Torch 17a can then be manually activated, leaving the other torches off, and the "forward", and "run" buttons pushed. This will cause the CNC to move all the torches in a re-tracing manner to their respective termination points 29a–29c, with the remainder of piece 19a being cut. The normal automatic forward mode of the program can then be continued to move the torches on to the next row.

As to piece 19b, however, it would be quite time consuming to back up all the way to the beginning of the lost cut as in the first illustration, due to its position substantially closer to start-pierce point 28b. Therefore, in this situation, and when the torches are stopped at their respective termination points 29a–29c, the operator pushes the "return to pierce" button on panel 26 which automatically moves the torches directly from points 29a–29c to their respective start-pierce points 28a–28c in the same row. The machine can then be run forwardly with the torches off until torch 17b reaches the point of lost cut, at which time the operator starts only torch 17b and lets the machine continue on in its automatic mode, retracing its original cutting path to the termination points 29a–29c. The operation can then be automatically continued forwardly to the next row.

As to piece 19c, it is to be observed that this cut was lost right at the beginning for reasons discussed heretofore. In this situation, and when the torches reach and stop at their respective termination points 29a–29c, the operator pushes the "return to pierce" button and starts only torch 17c. The torches, including torch 17c, will automatically advance directly to the respective start-pierce points 28a–28c in the same row. The machine can then be run forwardly in its usual automatic mode to cut the entire piece, with torch 17c ending up at termination point 29c. The operation is then continued.

Various modes of carrying out the invention are contemplated as being within the scope of the following claims particularly pointing out and distinctly claiming the subject matter which is regarded as the invention.

I claim:

1. A computerized numerically controlled flame cutting machine for cutting a plurality of pieces from a plate-like workpiece, comprising in combination:
    (a) a bridge mounted for movement along a Y axis,
    (b) a plurality of carriages ganged together on said bridge for movement along an X axis,
    (c) flame cutting torches mounted to said carriages for cutting said workpiece,
    (d) motive means for moving said bridge and carriages along their respective axes,
    (e) programmable numerical control means for actuating said motive means and said torches to cut a plurality of rows of a plurality of pieces automatically in succession from the workpiece,
    (f) said numerical control means being programmed with an automatic mode to sequentially initially position each said torch at a start-pierce point on the workpiece and to complete the original cut of a piece at a termination point spaced from said start-pierce point,
    (g) said numerical control means also being programmed in the said automatic mode to sequentially move said torches automatically from the respective termination points to the next row of pieces to be cut, (h) selectively actuatable means to interrupt the automatic mode sequencing of said programmable numerical control means to cause said torches to automatically move from their respective termination points in the row of cut pieces and directly to their respective start-pierce points in said last-named row for subsequent re-establishment of one or more lost cuts, (i) and further selectively actuatable means to actuate the normal forward automatic sequencing of said programmable control means to cause said torches to forwardly retrace their original cutting path subsequent to reaching the respective start-pierce points from the respective termination points in the row of cut pieces.

2. A computerized numerically controlled flame cutting machine for cutting a plurality of pieces from a plate-like workpiece, comprising in combination:

(a) a bridge mounted for movement along a Y axis, (b) a plurality of carriages ganged together on said bridge for movement along an X axis, (c) flame cutting torches mounted to said carriages for cutting said workpiece, (d) motive means for moving said bridge and carriages along their respective axes, (e) programmable numerical control means for actuating said motive means and said torches to cut a plurality of rows of a plurality of pieces automatically in sucession from the workpiece, (f) said numerical control means being programmed with an automatic mode to sequentially initially position each said torch at a start-pierce point on the workpiece and to complete the original cut of a piece at a termination point spaced from said start-pierce point, (g) said numerical control means also being programmed in the said automatic mode to sequentially move said torches automatically from the respective termination points to the next row of pieces to be cut, (h) first selectively actuatable means to interrupt the automatic mode sequencing of said programmable numerical control means to cause said torches to automatically move from their respective termination points in the row of cut pieces and directly to their respective start-pierce points in said last-named row for subsequent re-establishment of one or more cuts, (i) second selectively actuatable means to interrupt the automatic mode sequencing of said programmable numerical control means to cause said torches to move in a reverse cutting direction from the respective termination points in the row of cut pieces and to the commencement portion of a lost cut, (j) and third selectively actuatable means to actuate the normal forward automatic sequencing of said programmable control means to cause said torches to retrace their original cutting path subsequent to reaching the said commencement portion of a lost cut.

3. The computerized numerically controlled flame cutting machine of claim 1 or 2 which includes: selectively actuatable means for actuataing each said torch independently of the other torches so that a torch traversing a lost cut portion is on and a torch traversing a previously cut portion is off.

4. A method of re-establishing a lost cut made by a computerized numerically controlled flame cutting machine having a plurality of torches connected for actuation in an automatic mode by a programmable numerical control for cutting a plurality of rows of a plurality of pieces automatically in sucession from a plate-like workpiece, and wherein the numerical control is programmed to sequentially initially position each torch at a start-pierce point on the workpiece and to originally cut and then complete the original cut of a piece at a termination point spaced from said start-pierce point, said method comprising the steps of:

(a) selectively interrupting the automatic mode sequencing of the programmable numerical control to automatically move the torches from their respective termination points in the row of cut pieces directly to their respective start-pierce points in said last-named row, (b) moving said torches in said row of cut pieces to the portion of commencement of a lost cut, (c) actuating only the torch which is adjacent the said lost cut portion, (d) and then forwardly retracing the original cutting path to finally cut the lost cut portion.

* * * * *